United States Patent Office 3,577,428
Patented May 4, 1971

3,577,428
2-AMINO-4-ARYLOXYALKYL-4-ALKYL-
2-OXAZOLINES
John T. Suh, Mequon, and Joseph A. Skorcz, Milwaukee, Wis., assignors to Colgate-Palmolive Company, New York, N.Y.
No Drawing. Filed Apr. 14, 1969, Ser. No. 816,078
Int. Cl. C07d 85/36
U.S. Cl. 260—307                5 Claims

ABSTRACT OF THE DISCLOSURE

Compounds are 2-amino-4-aryloxyalkyl-4-alkyl-2-oxazolines which are useful as central nervous system stimulants and antihypertensive agents. The compounds may also be used as intermediates in the preparation of pickling agents, mothproofing agents and wood preservatives. Among the compounds disclosed is 2-amino-4-methyl-4-(o-methoxyphenoxy)methyl-2-oxazoline hexamate.

DESCRIPTION OF THE INVENTION

The compounds of the present invention may be represented by the following formula

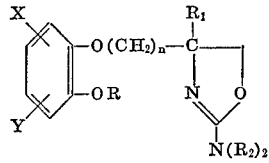

in which X and Y are selected from hydrogen, a halogen such as chloro, bromo or fluoro and trifluoromethyl, R is a lower alkyl of 1 to 4 carbon atoms such as methyl, ethyl and isopropyl, $R_1$ is hydrogen or a lower alkyl of 1 to 4 carbon atoms, and $R_2$ is selected from hydrogen, a lower alkyl of 1 to 4 carbon atoms, phenyl, a halosubstituted phenyl such as p-chlorophenyl, a lower alkoxy-substituted phenyl such as o-methoxyphenyl, a phenyl-lower alkyl of 7 to 13 carbon atoms such as benzyl, phenethyl, and phenylisopropyl, a cycloalkyl of 3 to 7 carbon atoms such as cyclopropyl, cyclopentyl and cyclohexyl and a cycloalkyl-lower alkyl in which the cycloalkyl portion contains 3 to 7 carbon atoms such as cyclopentyl methyl and cyclohexyl ethyl and $n$ is a number from 1 to 6.

The compounds of the present invention may be conveniently prepared from a starting material having the following formula:

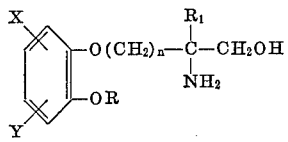

in which all symbols are as previously defined. Representative of the compounds which may be employed as starting materials are the following:

2-amino-2-methyl-3-(o-methoxyphenoxy)-propanol,
2-amino-2-methyl-3-(2-methoxy-4-chlorophenoxy)-propanol,
2-amino-2-methyl-3-(2-ethoxy-4-chlorophenoxy)-propanol,
2-amino-2-methyl-3-(2-methoxy-4-fluorophenoxy)-propanol,
2-amino-2-methyl-3-(2-methoxy-4-trifluoromethylphenoxy)-propanol,
2-amino-2-methyl-3-(2-methoxy-5-fluorophenoxy)-propanol,
2-amino-2-methyl-3-(2-methoxy-5-bromophenoxy)-propanol,
2-amino-2-methyl-3-(2-methoxy-5-trifluoromethylphenoxy)-propanol,
2-amino-2-ethyl-3-(2-ethoxy-5-fluorophenoxy)-propanol, and
2-amino-2-isopropyl-5-(2-methoxy-4-fluorophenoxy)-pentanol.

The above described starting materials may be prepared by the application of known chemical techniques from appropriate starting materials.

The compounds in which $R_2$ is hydrogen are preferably prepared by dissolving a suitable aminoalcohol in methanol containing anhydrous sodium acetate to which solution is added dropwise under nitrogen pressure, a solution of cyanogen bromide. The reaction mixture is maintained at room temperature with stirring until the reaction is substantially complete, e.g. up to 20 hours or more. The desired product is then obtained by removing the solvent, preferably by evaporation, and purifying the desired product by chromatographic techniques. The desired compounds are generally in the form of oils which for ease of handling may be converted to solid salts, such as the hexamates. The above described process may be illustrated as follows:

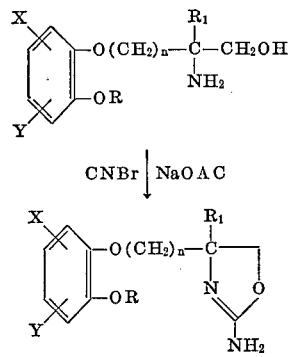

in which $R_1$, $n$, and X and Y are as previously defined.

The compounds in which the 2-amino group is substituted can be prepared by allowing β-chloroalkylurea to react with hot water. (R. C. Elderfield, Heterocyclic Compounds, volume 5, 1957, John Wiley & Sons, Inc.) The above described process may be illustrated as follows:

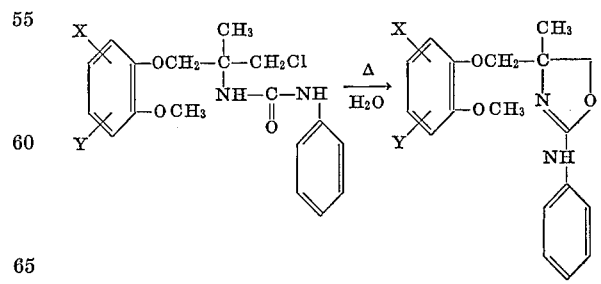

Representative of the compounds which may be prepared by the above described processes are the following:

2-amino-4-methyl-4-(o-methoxyphenoxy)methyl-2-oxazoline,
2-amino-4-methyl-4-(2-methoxy-4-chlorophenoxy)methyl-2-oxazoline,
2-amino-4-methyl-4-(2-methoxy-5-fluorophenoxy)methyl-2-oxazoline,
2-amino-4-methyl-4-(2-methoxy-5-trifluoromethylphenoxy)methyl-2-oxazoline,
2-dimethylamino-4-methyl-4-(2-methoxy-4-fluorophenoxy)methyl-2-oxazoline,
2-methylamino-4-methyl-4-(2-ethoxy-4-chlorophenoxy)methyl-2-oxazoline,
2-amino-4-ethyl-4-(2-methoxy-6-fluorophenoxy)propyl-2-oxazoline,
2-dimethylamino-4-methyl-4-(2-methoxy-5-trifluoromethylphenoxy)butyl-2-oxazoline,
2-anilino-4-methyl-4-(2-methoxy-5-fluorophenoxy)2-oxazoline,
2-amino-4-(2-methoxy-5-trifluoromethylphenoxy)methyl-2-oxazoline.
2-amino-4-methyl-4-(2-methoxy-5-bromophenoxy)methyl-2-oxazoline,
2-amino-4-methyl-4-(2-methoxy-6-bromophenoxy)methyl-2-oxazoline,
2-amino-4-(o-methoxyphenoxy)methyl-2-oxazoline,
2-amino-4-(2-methoxy-5-fluorophenoxy)methyl-2-oxazoline,
2-amino-4-(2-methoxy-5-trifluoromethylphenoxy)methyl-2-oxazoline.

Acid addition salts of the novel compounds may be conveniently prepared by conventional means. Among the acids which may be used to prepare such salts are hydrochloric acid, succinic acid, tartaric acid, benzoic acid and fumaric acid.

When intended for pharmaceutical use the compounds, preferably in the form of their acid addition salts, are combined with one or more suitable diluents or pharmaceutical additives and formed by use of conventional techniques into suitable dosage forms for oral or parenteral administration such as, for example, tablets, capsules or parenteral solutions.

The compound 2-amino-4-methyl-4-(o-methoxyphenoxy)methyl-2-oxazoline hexamate was found in animal behavior studies to produce a central nervous system stimulation when administered in intraperitoneal doses ranging from 10 mg./kg. to 100 mg./kg. The studies also indicated that the compound had an $LD_{50}$ of about 130 mg./kg. intraperitoneally. The behavioral studies were conducted in accord with the procedure set forth by Irwin in "Animal and Clinical Pharmacologic Techniques in Drug Evaluation," J. H. Nodine and P. E. Siegler, Ed. Year Book Publishers Inc., 1964, pages 36–54.

In addition, the compound was found in the anesthetized cat preparation, the standard animal test for antihypertensive activity, to significantly lower blood pressure when administered in a 10 mg./kg. dose intravenously. In addition, the compound when tested upon the isolated vas deferens of the rat for norepinephrine activity was found to potentiate the effects of norepinephrine.

The compounds of the present invention also possess utility as intermediates which may be used in the preparation of wood preservatives, mothproofing agents and pickling inhibitors. For example, the thiocyanic acid addition salts of the compounds when condensed with formaldehyde form resinous materials useful as pickling agents in accord with the teaching of U.S. Patents 2,425,320 and 2,606,155. The compounds also form fluosilicic acid addition salts which are useful as moth-proofing agents in accord with the teaching of U.S. Patents 1,915,334 and 2,075,359.

The following examples are presented to illustrate the practice of the present invention:

Example 1.—2-amino-4-methyl-4-(o-methoxyphenoxy)methyl-2-oxazoline hexamate

To a stirred solution at 0° of 2-amino-2-methyl-3-(o-methoxyphenoxy)propanol (6 g., 0.028 mole) and 4.8 g. (0.0588 mole) of anhydrous sodium acetate in 75 ml. of cyanogen bromide (3.3 g., 0.0308 mole) in 35 ml. of MeOH is added dropwise under nitrogen a solution of methanol. The resulting cloudy solution is stirred at room temperature for 20 hours, then evaporated to dryness. The semi-solid residue is dissolved in water, treated with 20 ml. of saturated $K_2CO_3$ solution, and extracted with three 60-ml. portions of ether, which are combined, dried, and evaporated. Elution of the residual oil from 350 g. of alumina with ether-chloroform (3:1) affords a colorless oil, which is converted to a hexamate. The resulting 2-amino - 4-methyl-4-(o-methoxyphenoxy)methyl-2-oxazoline hexamate, a white powder, melts at 106–108.5°. An analytical sample recrystallized from ethanol-ether melted at 108–110°.

*Analysis.*—Calcd. for $C_{18}H_{29}N_3O_6S$ (percent): C, 52.03; H, 7.03; N, 10.11. Found (percent): C, 51.83; H, 7.10; N, 10.32.

Example 2.—2-amino-4-methyl-4-(2-methoxy-4-chlorophenoxy)methyl-2-oxazoline hexamate The procedure of Example 1 was repeated using 5.9 g. (0.024) mole) of 2-amino-2-methyl-3-(2-methoxy-4-chlorophenoxy)propanol. 2 - amino - 4 - methyl - 4 - (2-methoxy-4-chlorophenoxy)methyl-2-oxazoline hexamate was obtained in the form of a white powder, M.P. 92–93.5°.

*Analysis.*—Calcd. for $C_{18}H_{28}ClN_3O_6S$ (percent): C, 48.04; H, 6.27; N, 9.34. Found (percent): C, 47.89; H, 6.11; N, 9.27.

Example 3

When in the procedure of Example 1 the compound 2 - amino - 2 - methyl - 3 - (o-methoxyphenoxy)propanol is replaced with an equal amount of 2-amino-2-methyl-3-(2-ethoxy-4-chlorophenoxy)-propanol,
2-amino-2-methyl-3-(2-methoxy-4-fluorophenoxy)-propanol,
2-amino-2-methyl-3-(2-methoxy-4-trifluoromethylphenoxy)-propanol,
2-amino-2-methyl-3-(2-methoxy-5-fluorophenoxy)-propanol,
2-amino-2-methyl-3-(2-methoxy-5-trifluoromethylphenoxy)-propanol, and
2-amino-2-ethyl-3-(2-ethoxy-5-fluorophenoxy)-propanol, respectively, there are obtained, 2-amino-4-methyl-4-(2-ethoxy-4-chlorophenoxy)methyl-2-oxazoline,
2-amino-4-methyl-4-(2-methoxy-4-fluorophenoxy)methyl-2-oxazoline,
2-amino-4-methyl-4-(2-methoxy-4-trifluoromethylphenoxy)methyl-2-oxazoline,
2-amino-4-methyl-4-(2-methoxy-5-fluorophenoxy)methyl-2-oxazoline,
2-amino-4-methyl-4-(2-methoxy-5-trifluoromethylphenoxy)methyl-2-oxazoline, and
2-amino-4-ethyl-4-(2-ethoxy-5-fluorophenoxy)methyl-2-oxazoline, respectively.

We claim:
1. A compound selected from compounds of the formula

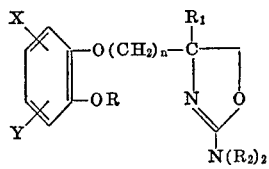

and acid addition salts thereof, in which X and Y are selected from hydrogen and halogen, R is lower alkyl, $R_1$ is hydrogen or a lower alkyl and $R_2$ is selected from hydrogen and lower alkyl of 1 to 4 carbon atoms and $n$ is 1.

2. A compound of claim 1 in which X and Y are hydrogen or halogen, R and $R_1$ are methyl and $R_2$ is hydrogen.

3. A compound of claim 1 in which R and $R_1$ are methyl and $R_2$ is hydrogen or lower alkyl.

4. A compound of claim 1 in which X is hydrogen, Y is 4-chloro, R and $R_1$ are lower alkyl and $R_2$ is hydrogen.

5. A compound of claim 1 in which X and Y are hydrogen, R is methyl, $R_2$ is hydrogen $R_1$ is lower alkyl and $n$ is 1.

References Cited
UNITED STATES PATENTS 3,161,650  12/1964  Poos _____ 260—307
3,278,382  10/1966  Poos _____ 167—65

ALEX MAZEL, Primary Examiner
R. V. RUSH, Assistant Examiner

U.S. Cl. X.R.

117—138.5; 260—570.7; 424—272